June 29, 1954  A. R. WIRKKALA  2,682,120
SCOOP ADJUSTMENT FOR CARRY TYPE SCRAPERS
Filed March 2, 1951  3 Sheets-Sheet 2
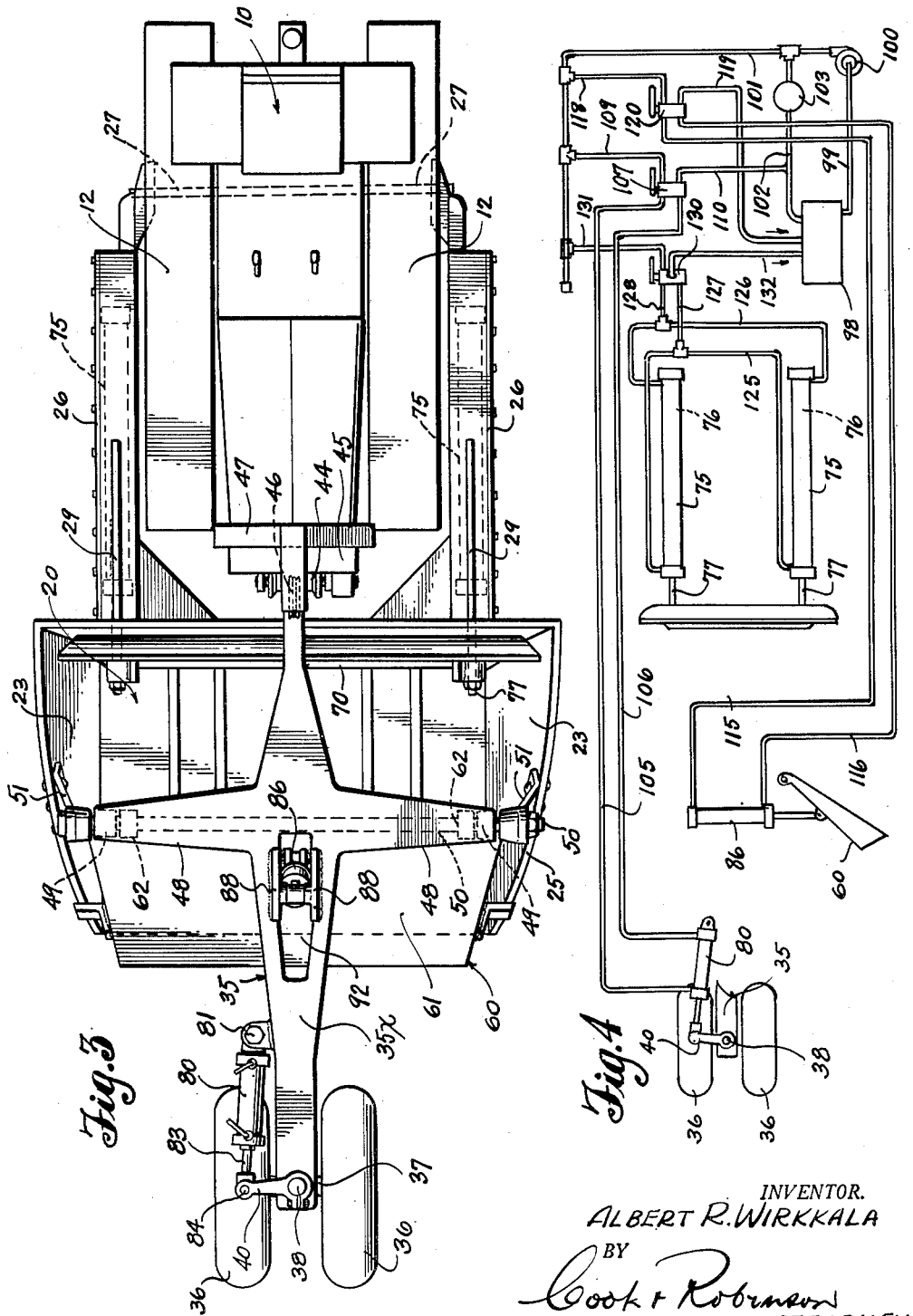
INVENTOR.
ALBERT R. WIRKKALA
BY
Cook + Robinson
ATTORNEY June 29, 1954  A. R. WIRKKALA  2,682,120
SCOOP ADJUSTMENT FOR CARRY TYPE SCRAPERS
Filed March 2, 1951  3 Sheets-Sheet 3
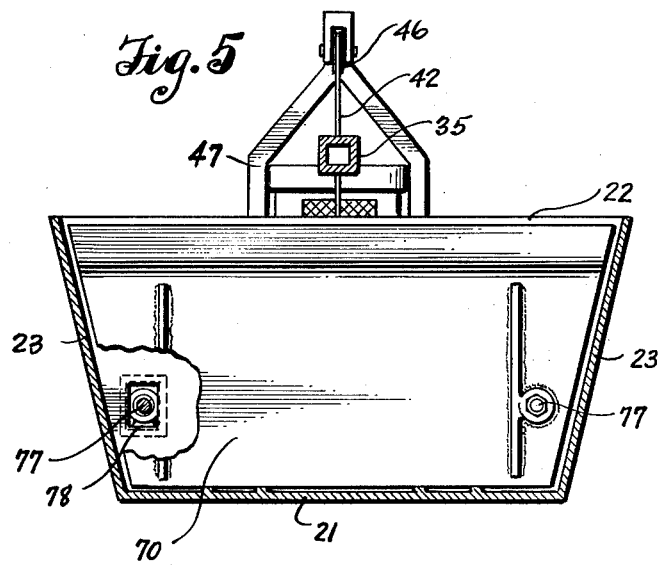
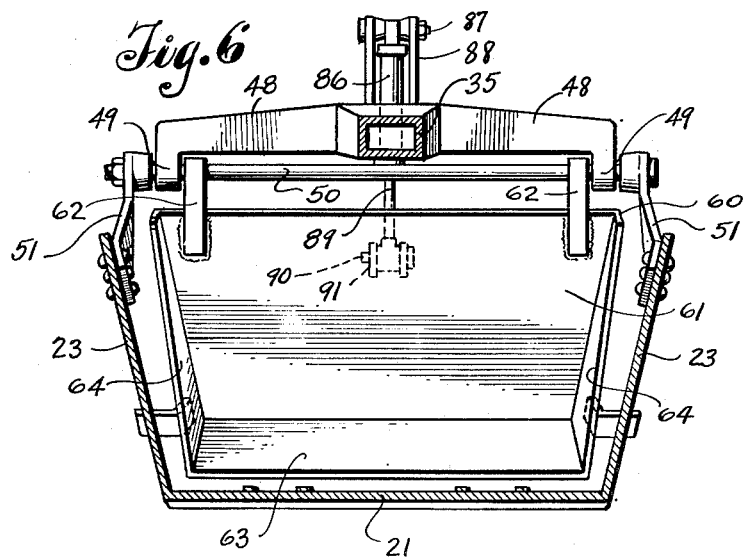
INVENTOR.
ALBERT R. WIRKKALA
BY
Cook & Robinson
ATTORNEYS

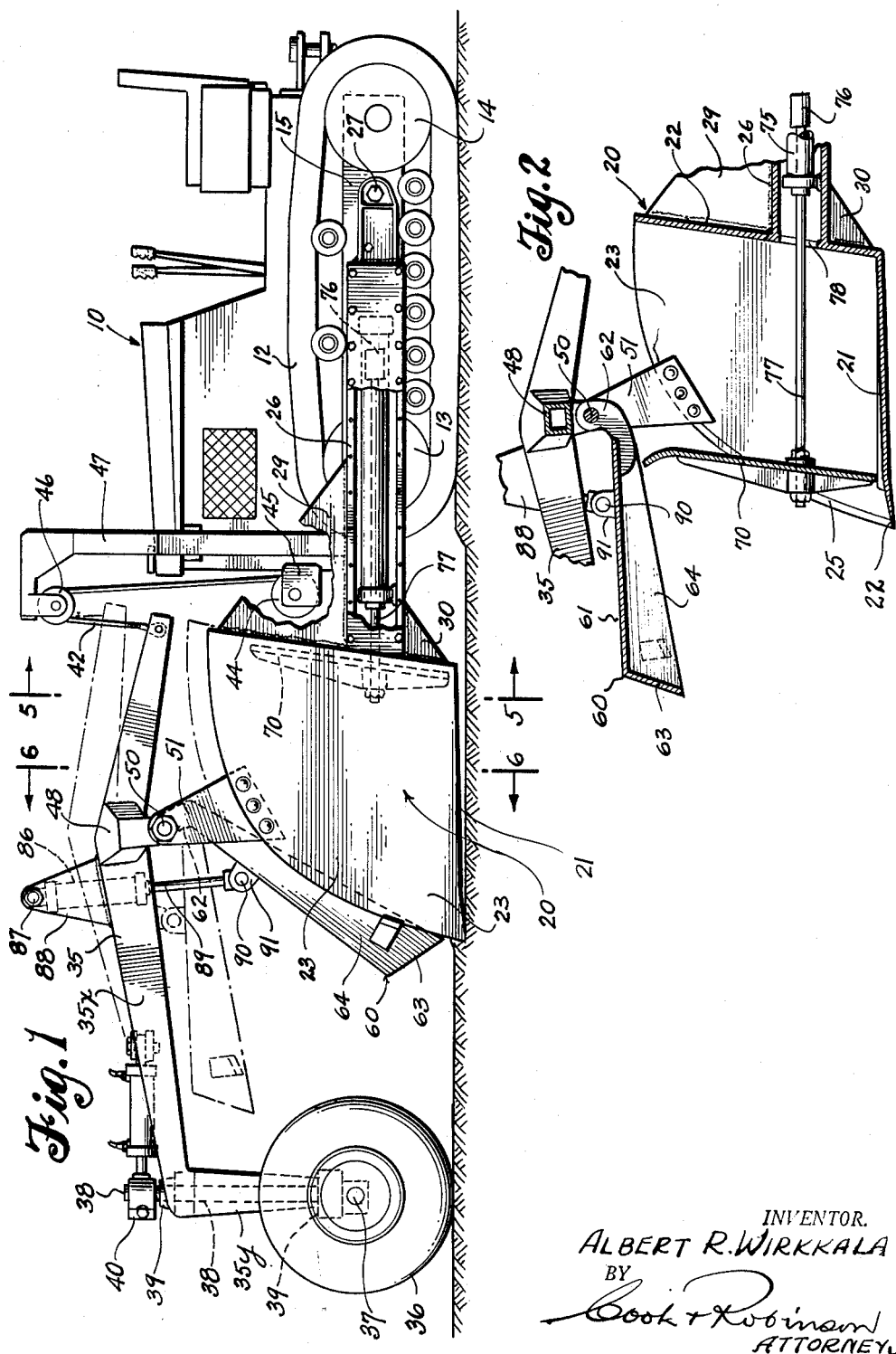

UNITED STATES PATENT OFFICE 2,682,120

SCOOP ADJUSTMENT FOR CARRY TYPE SCRAPERS

Albert R. Wirkkala, Naselle, Wash.

Application March 2, 1951, Serial No. 213,579

5 Claims. (Cl. 37—126)

This invention relates to earth handling equipment, and more particularly to vehicles of that character commonly referred to as "carry scrapers," that is, to those forms of vehicles adapted to scrape up their loads of earth from the ground into a scoop or bowl, and to transport them to points of disposal and there to mechanically eject them.

It is the principal object of this invention to provide a vehicle comprising a scoop that is designed to be supported from and pushed ahead of a tractor, and which may be controlled in its working elevation by means corresponding to the lift mechanism of the ordinary bulldozer blade.

More specifically stated, the present invention resides in the provision of a tractor-scraper combination wherein the scraper and earth carrier is of scoop form and is pushed by the tractor, and has a steerable supporting means forwardly thereof, and wherein the scraper bowl or scoop is equipped with a novel form of load ejector mechanism.

It is a further object of my invention to provide a tractor-scraper combination embodying the parts as above recited, and having individual, hydraulic control devices for the steering, elevating, load ejecting means, and the load retaining apron, all accessible to the operator from the driver's seat of the tractor.

It is also an object of the invention to provide a novel form of steerable front end support for a scraper or scoop, that is disposed forwardly of the propelling tractor.

Yet another object of the invention is to provide a novel form of load ejector mechanism that is incorporated with the push beams which carry the scraper or scoop.

Still further objects of the invention reside in the details of construction and combination of parts, and in their mode of operation, as will hereinafter be fully described.

In accomplishing these and other objects of the invention, I have provided the improved details of construction the preferred forms of which are illustrated in the accompanying drawings, wherein—

Fig. 1 is a side view of a tractor-scraper combination embodying the improvements of the present invention therein.

Fig. 2 is a sectional view, taken in a vertcal plane, longtudinally of one of the push beams, and showing a part of the load carrying scoop and the load ejector plate in its advanced, or load ejecting position.

Fig. 3 is a plan or top view of the machine as seen in Fig. 1.

Fig. 4 is a diagram of the hydraulic control system for the various movable parts.

Fig. 5 is a vertical cross-section, taken on the line 5—5 in Fig. 1.

Fig. 6 is a vertical cross-section taken on line 6—6 in Fig. 1.

Referring more in detail to the drawings—

The present combination comprises a tractor for furnishing the motive power for the machine, and a scoop that is supported, in part, from the tractor and is adapted to be pushed thereby to scrape up loads of earth and to transport them to points of disposal.

In its preferred embodiment, the apparatus of the invention comprises a tractor of crawler track type, as shown, and designated generally by reference numeral 10. The tractor is equipped at opposite sides with crawler tracks of any suitable kind, here designated at 12—12 and mounted for travel about wheels 13—14 carried at front and rear ends of track frames 15. The tractor frame is supported from the track frames in the usual or in any suitable manner.

Located at the front end of the tractor, transversely thereof, is the earth scraping and carrying scoop designated in its entirety by numeral 20. This scoop comprises a bottom 21 in the form of a flat plate as seen in Figs. 2, 5 and 6; a substantially upright back wall 22, and opposite end walls 23 and 23 which are upwardly and laterally inclined as best understood by reference to their showing in Figs. 5 and 6. The forward edge of the bottom 21 may be beveled to a sharpened cutting edge, as at 22 in Fig. 2, or it may be equipped with an earth cutting blade, removably attached thereto as in the usual scraper. Also, the forward facing edges of the side walls 23 of the scoop may be sharpened for easy cutting off of earth when filling the scoop from a bank or in making a cut; such sharpening being indicated at 25 in Figs. 2 and 3.

The scoop 20 faces directly forwardly, as indicated in Figs. 1 and 3, and it is rigidly mounted at the forward ends of a pair of push beams 26—26; located along opposite sides of the tractor, outside of the crawler tracks. At their rearward ends the beams 26—26 are pivotally fixed to the tractor, or track frames by members 27. These members may be the extended opposite end portions of a cross-shaft that mounts the track frames, as indicated in Fig. 3, or it may be stub shafts fixed in the track frames in transverse alignment. The mounting of these push beams is in accordance with the usual mounting of the push beams of a bulldozer blade and it is now anticipated that the present device be interchangeably used with a bulldozer, by removal of the bulldozer and applying the push beams 26—26 of the present scoop to the bulldozer mountings as provided on the track frames.

At their forward ends, the push beams 26—26 have rigid attachment to the back wall of the scoop 20, as is well shown in Figs. 1, 2 and 3. These beams are secured to the back wall near the corresponding opposite ends of the scoop by welding or in other suitable manner, and rigidity of securement is further obtained by use of web plates 29—30 extending along top and under sides of the beams and welded thereto and to the back plate of the scoop.

The means for controlling the working depth of the scoop as required for scraping up earth, and for elevating it for transporting a load, comprises the following parts:

Extending in the longitudinal direction of the machine, and centrally across the scoop, is a "gooseneck" beam 35. This comprises a horizontally directed main portion 35x with a downwardly directed leg 35y at its forward end. Mounted at the lower end of this leg is a pair of supporting and steering wheels 36—36, mounted on opposite ends of a cross axle 37. Fixed to the cross axle, between the paired wheels, is a vertical steering shaft 38 that is rotatable in bearings 39—39 incorporated in upper and lower end portions of the leg 35y. The shaft 38 extends above the gooseneck beam and is there equipped with a laterally directed steering lever arm 40, as seen in Fig. 3. Means for steering will be described later in connection with the hydraulic system.

The rear end of the beam 35 terminates just forwardly of the tractor, as seen in Fig. 1, and it is adjustably suspended by means of a cable 42. The cable extends from the cable winding drum 44 of a winch 45 that is mounted on the front end of the tractor and operated by a power take-off from the tractor engine. Passing from the drum 44, the cable extends upwardly and over a cable guide sheave 46 suspended from the top end of an A-frame 47 that is fixed rigidly to the front end of the tractor frame. The end of the cable is attached to the beam as indicated at 48 in Fig. 1. By causing the winch mechanism to wind in or to pay out the cable 42, the rear end of the beam 35 may be raised or lowered accordingly, thus to control the working depth or elevation of the scoop as will now be explained.

Extending laterally from the beam 35 in opposite directions, over the forward end portion of the scoop, are arms 48—48. At their outer ends the arms have downwardly directed lugs 49—49 integral therewith. Extended horizontally and transversely of the beam 35 and through the lugs 49—49 is a pivot shaft 50, the opposite ends of which are pivotally contained in upstanding brackets 51—51 fixed to the opposite end walls 23—23 of the scoops, as best seen in Figs. 1 and 6. Thus, through the mediacy of the cross-shaft 50, and arms 48—48, the main weight of the scoop 20, and its load, will be supported from the beam 35. The beam, in turn is supported at its forward end by the set of steering wheels 36—36, and at its rear end is suspended by the cable 42 from the upper end of the A-frame that is fixed to the front end of the tractor.

In order to retain a load of material in the scoop 20 while it is being loaded, or while being transported, I provide the scoop with an apron that is designated in its entirety by numeral 60. This comprises a forwardly and downwardly directed plate 61 that is hingedly suspended from the cross shaft 50 by means of hinge lugs 62—62 that are welded to its upper edge and through which the pivot shaft 50 extends. At its lower edge, the plate 61 has a back turned retainer flange 63 and along its side edges, has back turned flanges 64. This apron is adapted to close down against the forward edge of the scoop as seen in Fig. 1, or to be moved to raised position of Fig. 2. Also, it may be positioned and held at any intermediate position by means which will presently be described in connection with the hydraulic system.

For the ejection of a load from the scoop, I provide an ejector plate 70 that is disposed in the bowl and may be retracted to a position against the back wall, as indicated in dotted lines in Fig. 1, and advanced from that position, to a forward position, as shown in full lines in Fig. 2. The movements of this ejector plate are controlled and effected by means of hydraulic jacks contained in the thrust beams 26—26 and controlled as hereinafter explained.

Referring more particularly to Figs. 1, 2 and 3: It is to be observed that the push beams 26—26 are hollow. Contained in each beam, in its longitudinal direction, and rigidly secured thereto is a hydraulic cylinder 75. Contained in these cylinders are pistons 76 from which rods 77 extend forwardly from the cylinder heads and through openings 78 in the back wall of the scoop and at their forward ends are rigidly secured to the ejector plate 70, as shown in Fig. 2. By extending and retracting the piston rods, the plate 70 will be moved to and from load ejecting position.

For the control of the various operations, such as steering, scoop raising and lowering, apron raising and lowering and ejector plate operation, I provide a hydraulic system and parts shown in Fig. 4. This will now be explained.

To control the steering operation, I provide a hydraulic jack comprising a cylinder 80, that is pivotally mounted at one end on beam 35 by bolt 81, and has a piston rod 83 extended therefrom and pivotally connected at 84 to the outer end of the steering arm 40.

For the operation of the apron 60 I provide a jack comprising a hydraulic cylinder 86 that is pivoted at its upper end, as at 87 between paired upstanding brackets 88—88 on beam 35. A piston rod 89 extends downwardly from the cylinder 86 and is pivotally connected at its lower end, as at 90, to a lug 91 on the apron plate 61. It is shown in Fig. 3, that the jack cylinder 86 is freely contained within an opening 92 in the beam 35.

To furnish hydraulic medium to the various cylinders 75—75, 80 and 86 for the operation of the hydraulic jacks, I provide a pressure system as shown in Fig. 4. This comprises an oil reserve tank 98 and connected with this tank is a pressure circuit comprising a pipe 99 that leads from the tank to the intake of a continuously driven pump 100; a pipe 101 that leads from the discharge side of the pump and a return pipe 102 that leads from pipe 101 to the tank 98 in which pipe 102 a pressure relief valve 103 is interposed.

First describing the control of the steering wheels: Pressure lines 105—106 extend from opposite ends of cylinder 80 to a four way control valve 107. This valve has pipe connections 109 and 110, respectively, with the pressure line 101 and with the return line 102 as shown or direct to tank 98. Thus, by manipulation of the control lever of valve 107, pressure medium can be applied to either end of the jack cylinder 80, to actuate the lever 40 to change the steering direction of wheels 36—36. By setting the valve 107 at a neutral position, the wheels will be held at a set direction to which they have been adjusted.

For the control of the apron 60, pressure lines 115—116 extend from opposite ends of jack cylinder 86 to a four way control valve 120. This valve has connections 118—119 with the pressure line 101 and tank 98. By manipulation of valve 120, the apron can be lifted, lowered or held in any set position by setting the valve at a neutral position.

For the ejector plate operation, I provide the following: The forward ends of the cylinders 75—75, are joined by a pipe line 125, and their rear ends are likewise joined by a pipe line 126. Pipes 127 and 128 lead from lines 125 and 126 respectively to a four way control valve 130. This valve has connections 131 and 132 with the pressure line 101 and with tank 98. By manipulation of the valve, the ejector plate can be extended, retracted or held at set position.

With the equipment so constructed, it is readily apparent that the scoop will be rigidly mounted by the push beams and can be controlled in its working operations by the driver or operator of the tractor. The lowering of the scoop for the scraping up of a load of dirt is accomplished by paying out the cable 42 from the drum 45. This lowers the rear end of beam 35 and effects a downward adjustment of the scoop to cause its forward edge to engage the ground and enter to a desired depth as regulated by the beam 35.

Filling of the scoop is accomplished while the apron 60 is in a lifted position, and the ejector plate retracted. When the scoop has been filled to a desired extent, it is lifted clear of the ground and the apron dropped to a closed position especially if the load is to be transported to any appreciable distance. Raising of the scoop is effected by winding in of the cable 42 on drum 45. The lowering of the apron is effected by an adjustment of control valve 120, that permits the delivery of pressure medium to the upper end of the jack cylinder 86.

During transportation of the load, steering can be easily effected by the steering of the wheels 36—36 as provided for through the manipulation of control valve 107. When the load is to be discharged, the apron is lifted to open position, as seen in dotted lines in Fig. 1 and the ejector plate advanced by the turning of the valve 130 to a position that causes the hydraulic pressure medium to be delivered into the rear ends of the jack cylinders 75—75. By a controlled advancement of the plate while the scoop is being advanced forwardly, the load can be spread over a surface and leveled at the same time by the scoop.

By reason of the forward edges of the side walls of the scoop being sharpened, these walls can be used for filling the bowl from a bank or side wall of a cut.

Having thus described my invention, what I claim as new therein and desire to secure by Letters Patent, is:

1. A vehicle of the character described comprising in combination, a tractor, a forwardly opening scoop disposed forwardly of the tractor, push beams rigidly fixed to the scoop and extended rearwardly therefrom along opposite sides of the tractor and having pivotal connections with the tractor at their rear ends, a beam disposed across the scoop in the central longitudinal plane thereof and extended forwardly thereof, steerable ground wheels supporting said beam at its forward end; an adjustable means on the tractor supporting the beam at its rearward end and whereby it may be vertically adjusted at that end, and means on the beam, between its ends, supporting the scoop therefrom at a definite working elevation as established by the vertical adjustment of the rearward end of said beam and maintaining the alignment of the beam with the scoop and tractor.

2. A construction as recited in claim 1 wherein the scoop extends laterally beyond the sides of the tractor and the push beams are located within the lateral limits of the scoop.

3. A construction as recited in claim 1 wherein the scoop extends beyond the sides of the tractor and the push beams are located within the lateral limits of the scoop, and wherein the scoop has opposite end walls disposed in an upwardly and outwardly sloping position and sharpened along their forward edges.

4. Apparatus as recited in claim 1 wherein the said means on the beam supporting the scoop therefrom comprises arms extended laterally in opposite direction from the beam and rigid relative thereto, and said arms having transversely aligned pivotal connections at their outer ends with the corresponding ends of the scoop, and through which arms and pivotal connections the alignment of the beam with the scoop is maintained.

5. Apparatus as recited in claim 4 including also an apron that is pivotally suspended from the laterally directed arms to swing downwardly to close against the forward end of the scoop about a hinge axis that is aligned with the pivotal connections provided between the said arms and opposite ends of the scoop, and power means is mounted on the beam and connected with said apron to raise and lower it.

References Cited in the file of this patent

UNITED STATES PATENTS

| Number | Name | Date |
|---|---|---|
| 2,253,745 | Wold | Aug. 26, 1941 |
| 2,263,028 | Brownell | Nov. 18, 1941 |
| 2,288,630 | Le Tourneau | July 7, 1942 |
| 2,305,481 | Le Bleu | Dec. 15, 1942 |
| 2,347,882 | Choate et al. | May 2, 1944 |
| 2,353,120 | Austin | July 11, 1944 |
| 2,376,979 | Patterson | May 29, 1945 |
| 2,402,352 | Taylor | June 18, 1946 |